United States Patent
Mutter et al.

(10) Patent No.: US 11,334,514 B2
(45) Date of Patent: May 17, 2022

(54) CIRCUIT FOR A BUS SYSTEM AND METHOD FOR OPERATING A CIRCUIT

(71) Applicant: Robert Bosch GmbH, Stuttgart (DE)

(72) Inventors: Arthur Mutter, Neuhausen (DE); Steffen Walker, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/040,947

(22) PCT Filed: May 7, 2019

(86) PCT No.: PCT/IB2019/053739
§ 371 (c)(1),
(2) Date: Sep. 23, 2020

(87) PCT Pub. No.: WO2019/211823
PCT Pub. Date: Nov. 7, 2019

(65) Prior Publication Data
US 2021/0026793 A1    Jan. 28, 2021

(30) Foreign Application Priority Data

May 4, 2018    (DE) .......................... 102018206926.3

(51) Int. Cl.
*G06F 13/40*    (2006.01)
*H04L 12/40*    (2006.01)
*H04L 25/02*    (2006.01)

(52) U.S. Cl.
CPC .... *G06F 13/4068* (2013.01); *H04L 12/40013* (2013.01); *H04L 25/0264* (2013.01); *H04L 2012/40215* (2013.01)

(58) Field of Classification Search
CPC .................................................. G06F 13/4068
See application file for complete search history.

(56) References Cited

U.S. PATENT DOCUMENTS

| 5,444,857 A | * | 8/1995 | Rowland | G06F 13/4072 |
| | | | | 710/305 |
| 6,522,689 B1 | * | 2/2003 | Heinrich | H04L 12/40032 |
| | | | | 375/224 |
| 2009/0086865 A1 | * | 4/2009 | Drapkin | H04L 25/085 |
| | | | | 375/350 |

FOREIGN PATENT DOCUMENTS

| DE | 102012208124 A1 | 11/2012 |
| DE | 102015214399 A1 | 2/2016 |

(Continued)

OTHER PUBLICATIONS

International Search Report for PCT/IB2019/053739, dated Oct. 7, 2019.

(Continued)

*Primary Examiner* — Henry Tsai
*Assistant Examiner* — Juanita Borromeo
(74) *Attorney, Agent, or Firm* — Norton Rose Fulbright US LLP; Gerard Messina (57) ABSTRACT

A circuit for a bus system is provided. The circuit includes: an ascertainment circuit, which is configured to ascertain a first state in which an absolute difference of a voltage between two bus-side terminals is above a threshold value, to ascertain a second state in which the absolute value of the voltage between the two bus-side terminals is below the threshold value, to ascertain a bit boundary as a function of a number of state transitions between the first and second state, and to ascertain at least one time window, the start of which is situated before the bit boundary and the end of which is situated after the bit boundary; and a suppression circuit, which is configured to be activated when a state transition from the first state into the second state occurs within the ascertained time window.

16 Claims, 4 Drawing Sheets

(56) References Cited

FOREIGN PATENT DOCUMENTS

| DE | 102015222334 A1 | 5/2017 |
|---|---|---|
| JP | 2017158180 A | 9/2017 |
| JP | 2018182431 A | 11/2018 |

OTHER PUBLICATIONS

Robert Bosch Gmbh, "Can Specification, Version 2.0," Bosch Can Specification Version 2.0, 1991, pp. 1-69.

* cited by examiner

CIRCUIT FOR A BUS SYSTEM AND METHOD FOR OPERATING A CIRCUIT

FIELD

The present invention relates to a circuit for a bus system and to a method for operating a circuit for a bus system.

BACKGROUND INFORMATION

Prolonged oscillations of a bus voltage of a bus system resulting from improper termination or from an improper topology of the bus system are known to be key factors, which may result in an error-prone data transmission. A reduction of the bit time due to increased transmission rates, in particular, is problematic in this case.

To compensate for the oscillations of the voltage, German Patent Application No. DE 10 2015 222 334 A1 describes that bus oscillations may be selectively masked when receiving data. A masking element is provided for masking oscillations of the bus signal for a predetermined masking time if a monitoring result indicates that a difference of the bus signal after a transition of the bus signal from a dominant to a recessive state exceed at least one predefined threshold value.

SUMMARY

The problems of the related art may be solved by a circuit and by a method in accordance with example embodiments of the present invention. Advantageous example embodiments and refinements of the present invention are described herein.

According to one first aspect of present invention, a circuit for a bus system is provided. In accordance with an example embodiment of the present invention, the circuit includes an ascertainment circuit, which is configured to ascertain a first state in which an absolute difference of a voltage between two bus-side terminals is above a threshold value, to ascertain a second state in which the absolute difference of the voltage between the two bus-side terminals is below the threshold value, to ascertain a bit boundary as a function of a number of state transitions between the first and second state, and to ascertain at least one time window, the start of which is situated before the bit boundary, and the end of which is situated after the bit boundary. The circuit also includes a suppression circuit, which is configured to be activated when a state transition from the first state into the second state occurs within the ascertained time window.

Thus, the activation of the suppression circuit is limited to the at least one ascertained time window and this yields the advantage that an erroneous activation of the suppression circuit outside the time window is prevented. By ascertaining the time window encompassing the bit boundary, the time domain is selected within which a higher probability of occurrence of the state transition is present than outside thereof. Short term signal interferences, in particular, which could be erroneously classified as a state transition, are masked outside the at least one ascertained time window. The robustness of the communication is increased as a result.

The circuit with a CAN bus system is, in particular, advantageous, since the state transition of the differential signal from dominant to recessive—taking the signal propagation times and delays in the bus system into account—are expected only around the bit boundary and starting from the dominant state of the differential signal. Outside the time window, the connection of the suppression circuit, for example, in the form of a connection of a resistor or of an active driving of the bus signal, is advantageously excluded in order not to cause any unnecessary reduction or increase in the total resistance in the CAN bus system.

One advantageous specific embodiment of the present invention includes that the ascertainment circuit is configured to block the activation of the suppression circuit outside the at least one time window. Actively blocking the connection of the suppression circuit reduces erroneous activations.

One advantageous specific embodiment of the present invention includes that the ascertainment circuit is configured to deactivate the suppression circuit between the two bus-side terminals no later than when the at least one time window ends. This advantageously ensures that the suppression circuit is not actively switched on between the two bus-side terminals outside the ascertained time window—i.e., when no state transition is expected.

One advantageous specific embodiment of the present invention includes that the ascertainment circuit is configured to position the at least one time window around the bit boundary in such a way that the time window starts maximally 20% of a bit time, in particular, maximally 10% of the bit time before the bit boundary and ends maximally 50% of the bit time, in particular, maximally 25% of the bit time after the bit boundary. The asymmetry around the bit boundary accounts for the fact that the probability of occurrence of the state transition is greater after the ascertained bit boundary than before the bit boundary.

One advantageous specific embodiment of the present invention includes that the ascertainment circuit is configured to limit an activation time period of the suppression circuit to below 50% of the bit time, in particular, to below 30% of the bit time. A larger portion of the bit time for activating the suppression circuit is therefore advantageously blocked, as a result of which the probability of an erroneous activation is further reduced.

One advantageous specific embodiment of the present invention includes that the ascertainment circuit is configured to ascertain a rising edge of a transmit input signal, and the suppression circuit being connectable as a function of the ascertainment of the rising edge of the transmit input signal. Since the suppression circuit is promptly connected, a potential overshoot is advantageously attenuated by already taking the transmit signal into account during transmission.

One advantageous specific embodiment of the present invention includes that the ascertainment circuit is configured to ascertain a transmission state as a function of the transmit input signal, and, during the ascertained transmission state, to not connect the suppression circuit as a function of the received output signal. The suppression circuit is advantageously connected only when the rising edge of the transmit signal is ascertained. A two-fold triggering by a subsequently identified state transition of the received signal is thus reliably prevented.

In one advantageous specific embodiment of the circuit in accordance with the present invention, the ascertainment circuit is configured to measure a time offset between a transmission of the transmit input signal and a reception of the received output signal corresponding to the transmit input signal in the form of the absolute difference of the voltage between the two bus-side terminals, and to shift the ascertained time window as a function of the ascertained time offset. A signal propagation time of a signal through the circuit and the bus system is advantageously ascertained with the time offset. The time offset is used to shift the ascertained time window in such a way that a high probability of occurrence of an edge change within the time window is provided. The time window, and thus the identification of the state transition, is dynamically adapted to the respectively present configuration of the bus system.

One advantageous specific embodiment of the present invention includes that the ascertainment circuit is configured to ascertain a data phase as a function of a profile of the absolute difference of the voltage between the two bus-side terminals, and to ascertain the time window only within the data phase. This advantageously excludes an influencing of the arbitration phase by the added suppression circuit. This is advantageous, in particular, if the data phase exhibits a higher data rate than the arbitration phase. At higher data rates, in particular, the attenuation via the short-term connection of the suppression circuit is advantageous.

One advantageous specific embodiment of the present invention includes that the ascertainment circuit is configured to ascertain an arbitration phase and the data phase as a function of the profile of the absolute difference of the voltage between the two bus-side terminals, and to ascertain the time window as larger during the arbitration phase than in the data phase. In this way, the time window and thus, the connection of the suppression circuit is adapted to the potentially varying bit rates in the arbitration phase and in the data phase.

One further aspect of the present invention relates to a transceiver for a user station of a bus system, the transceiver encompassing the circuit according to the first aspect.

One further aspect of the present invention relates to a method for operating a circuit for a bus system, the method including: ascertaining a first state, in which an absolute difference of a voltage between two bus-side terminals is above a threshold value; ascertaining a second state, in which an absolute difference of a voltage between two bus-side terminals is below a threshold value; ascertaining a bit boundary as a function of a number of state transitions between the first and second state; ascertaining a time window, the start of which is situated before the bit boundary and the end of which is situated after the bit boundary; and activating a suppression circuit between the two bus-side terminals if a state transition from the first state into the second state occurs within the ascertained time window.

DETAILED DESCRIPTION OF EXAMPLE EMBODIMENTS

Figure 1:
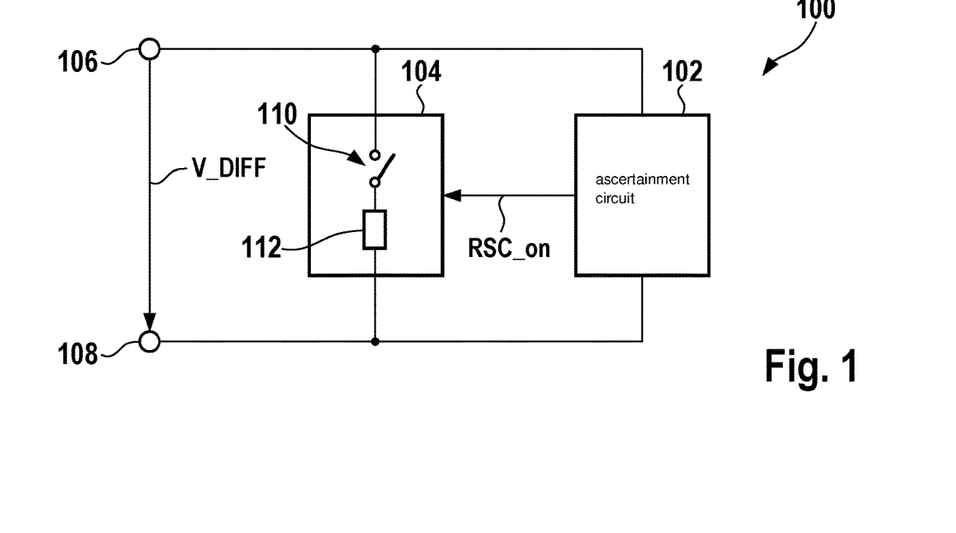
FIGS. 1 and 2 show a circuit in schematic form in accordance with an example embodiment of the present invention.

FIG. 1 shows a circuit 100 for a bus system. Circuit 100 includes an ascertainment circuit 102 and a suppression circuit 104, which are situated in parallel to one another between two bus-side terminals 106 and 108. Circuit 100 is connected via terminal 106 to a first bus line CAN_H. Circuit 100 is connected via terminal 108 to a second bus line CAN_L. Ascertainment circuit 102 ascertains at least two states as a function of a voltage V_DIFF, which drops between the two terminals 106 and 108. A first state is reached, for example, when an absolute value of voltage V_DIFF is above a threshold value. A second state is reached when the absolute value of voltage V_DIFF is below the aforementioned threshold value or a different threshold value. If the bus system is a CAN bus (CAN: Controller Area Network), then the first state is referred to as dominant and the second state is referred to as recessive. A bit boundary, i.e., a point in time of a possible or actual transition between the two states, is ascertained as a function of state transitions between the two aforementioned states. A time window is ascertained as a function of the ascertained bit boundary, the time window in each case including only one of the bit boundaries. Suppression circuit 104 may be activated with the aid of a signal RSC_on as long as the aforementioned time window is active.

Ascertainment circuit 102 is designed, for example, as an ASIC, FPGA or as a discrete circuit. Ascertainment circuit 102 also includes a processor, for example, which is equipped with software in order to carry out the respective functions defined by the software. Mixed forms encompassing a physical circuit and the processor on which the software is executed are, of course, also possible. The software is stored on a corresponding memory element. Circuit 100 is, for example, part of a transceiver for a user station of a bus system. In another specific embodiment, circuit 100 is designed in addition to an existing transceiver.

Suppression circuit 104 is provided for reducing differential voltage V_DIFF during the transition from dominant to recessive. Suppression circuit 104, depicted in schematic form, includes, for example, a switch 110 and a resistor 112 situated in series relative thereto. This resistor 112 is operated, for example, with different resistance values or impedance values. Suppression circuit 104 may, of course, also be differently designed and include, for example, a MOS-FET, a diode, or other components having a linear or non-linear behavior, in order to reduce the differential voltage during the transition from dominant to recessive. In a further example not shown, the suppression circuit includes a circuit element, which is designed for actively driving the bus signal between the two bus-side terminals 106, 108. Resistor 112 is connected between the two bus-side terminals 106, 108 only if a state transition from the first state (for example, dominant) to the second state (for example, recessive) occurs within the ascertained time window. As a result, resistor 112 is not activated outside the at least one ascertained time window. Thus, a blocking of the connection of resistor 112 between the two terminals 106 and 108 takes place outside the at least one time window. If the at least one time window ends, resistor 112 is disconnected as a function of signal RSC_on or as a function of the lapse of a connection time period.

Figure 2:
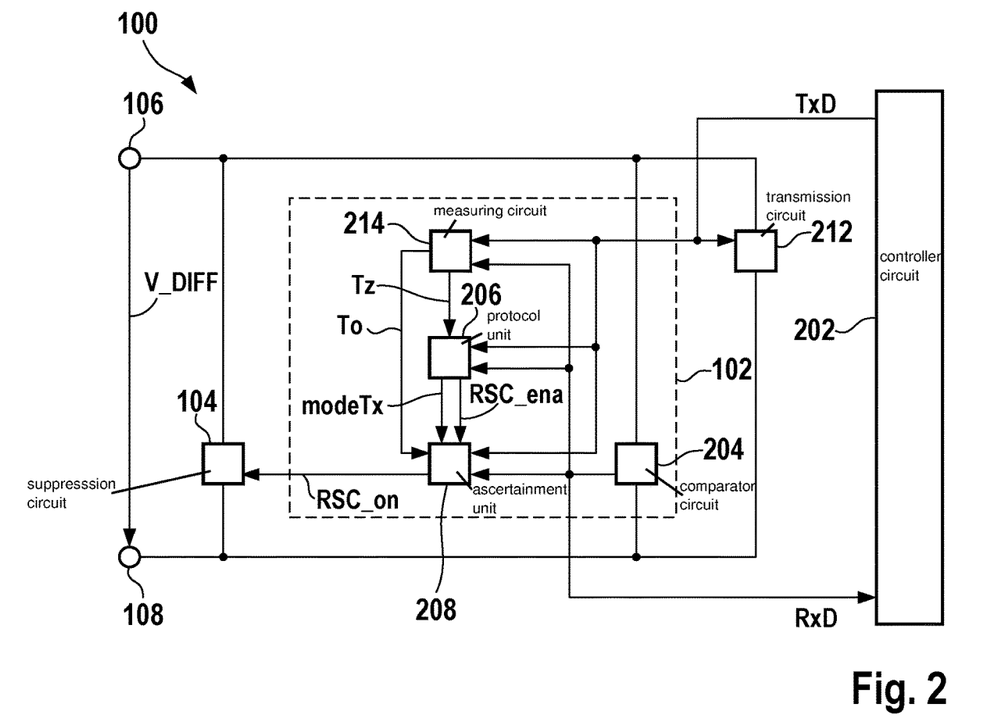

FIG. 2 shows circuit 100 in a schematic form. A controller circuit 202 generates a transmit input signal TxD and receives a received output signal RxD of circuit 100. Received output signal RxD is ascertained by a comparator unit 204 of ascertainment circuit 102 as a function of voltage V_DIFF. Circuit 100 in the example shown uses comparator unit 204 of the actual transceiver. In another example not shown, circuit 100 includes a separate comparator unit, which operates particularly fast, for example, or uses other threshold values. A protocol unit 206 interprets the received output signal RxD to the extent that the bit boundary is ascertained. The bit boundary is a point in time returning at regular intervals, characterized by frequency and phase, the bit boundary in CAN being ascertained, for example, with the aid of a simplified CAN protocol controller as a function of received output signal RxD. Protocol unit 206 determines the at least one time window, which includes the bit boundary, as a function of the bit boundary. A respective time window RSC_ena, in particular, is ascertained for each bit boundary, provided the start of time window RSC_ena coincides with the presence of the first state (dominant).

An ascertainment unit 208 ascertains as a function of received output signal RxD whether a state change of voltage V_DIFF from the first state into the second state is present. If this is the case and time window RSC_ena is present, the resistor of suppression circuit 104 is connected with the aid of generated signal RSC_on between the two terminals 106 and 108. This means that as long as time window RSC_ena is active, a release for the connection of the resistor of suppression circuit 104 is present. If the release expires, i.e., ends time window RSC_ena, the resistor is then disconnected either after the lapse of the connection time period or at the end of the connection time period of time window RSC_ena.

Protocol unit 206 positions time window RSC_ena, for example, symmetrically around the bit boundary. Protocol unit 206 positions time window RSC_ena preferably, however, asymmetrically relative to the bit boundary, the time window beginning, for example, maximally 20%, in particular, maximally 10% of a bit time, i.e., of a time period between two adjacent bit boundaries, before each bit boundary. The asymmetrical positioning of the time window encompasses time window RSC_ena ending maximally 50% of the bit time, in particular, maximally 30% of the bit time and, in particular, maximally 10% of the bit time after the associated bit boundary. Time window RSC_ena encompasses, in particular, a maximum of one bit boundary. The duration of the activation of the resistor is limited to 50% of the bit time, in particular, to 30% of the bit time, but encompasses at least 10% of the bit time. For example, time window RSC_ena is activated 20% of the bit time before the bit boundary and deactivated 50% of the bit time after the bit boundary or is activated 10% of the bit time before the bit boundary and is deactivated 30% of the bit time after the bit boundary.

Protocol unit 206 processes transmit input signal TxD and ascertains a presence of edge changes of the transmit input signal TxD. If edge changes are present and these fit the state on the bus, which is tracked via received output signal RxD, then a transmission state modeTx of circuit 100 is ascertained, which means that controller circuit 202 transmits a message. Transmit input signal TxD is fed to ascertainment unit 208 in order, in the presence of transmission state mode Tx and in the presence of a state transition of transmission circuit 212, to switch from a driven operating state into a non-driven operating state, which is identified, for example, in CAN by an edge change of transmit input signal TxD from zero to one, to connect the resistor of suppression circuit 104 between the two terminals 106 and 108 with the aid of signal RSC_on. In the presence of transmission state mode Tx, ascertainment unit 208 ignores a state change of received output signal RxD within time window RSC_ena. A double activation of the resistor in terms of connecting is thus prevented. The advantage of the combined evaluation of received output signal RxD and of transmit input signal TxD is that a reaction to the state change on the bus always rapidly takes place.

A measuring circuit 214 receives both received output signal RxD as well as transmit input signal TxD and ascertains a first time offset Tz and a second time offset To. First time offset Tz corresponds to a time period for detecting a bus state on the bus in the form of voltage v_DIFF with the aid of comparator unit 204 and for forwarding it to protocol unit 206. Second time offset To corresponds to a time period, which begins with a change of transmit input signal TxD provided by controller circuit 202 and ends at a point in time at which bus signal 106, 108 reacts to the preceding change. Time offsets Tz, To are determined, for example, in such a way that the propagation time of an edge change in transmit input signal TxD is measured until this edge change becomes visible in received output signal RxD and from which time offsets Tz, To are derived, for example, by halving the propagation time.

Protocol unit 206 shortens time window RSC_ena— provided the bit time begins and ends at the bit boundaries available to protocol unit 206—as a function of ascertained time offset Tz. For example, ascertained time window RSC_ena is shortened at the end by time offset Tz, thus preventing signal RSC_ena from being switched on at a point in time that is too late. Thus, time offset Tz helps protocol unit 206 to avoid seeing the state of the bus as time-offset.

Alternatively, instead of measuring, the measuring unit may also estimate time offsets Tz, To. For this purpose, the measuring unit has stored a temperature-related minimum and maximum value for time offsets Tz and To and ascertains by interpolation the values for time offsets Tz and Tz as a function of a temperature signal. For this purpose, input signals TxD and RxD are not required.

In addition, ascertainment unit 208 also processes time offset To in order, as a function of its value, to slow signal RSC_on in the event that signal mode Tx is set. This results in suppression circuit 104 being activated only when transmission circuit 212 no longer actually actively drives the bus. In other words, the propagation time differences of the individual circuit parts are thus taken into account in order to achieve an improved result.

Protocol unit 206 interprets received output signal RxD as a function of the protocol used and ascertains the presence of a data phase as a function of voltage V_DIFF and then forwards time window RSC_ena to ascertainment unit 208 only when the data phase is present. Furthermore, a distinction is made between an arbitration phase and the data phase and the at least one time window is selected to be smaller for the data phase than the at least one time window for the arbitration phase.

Figure 3:
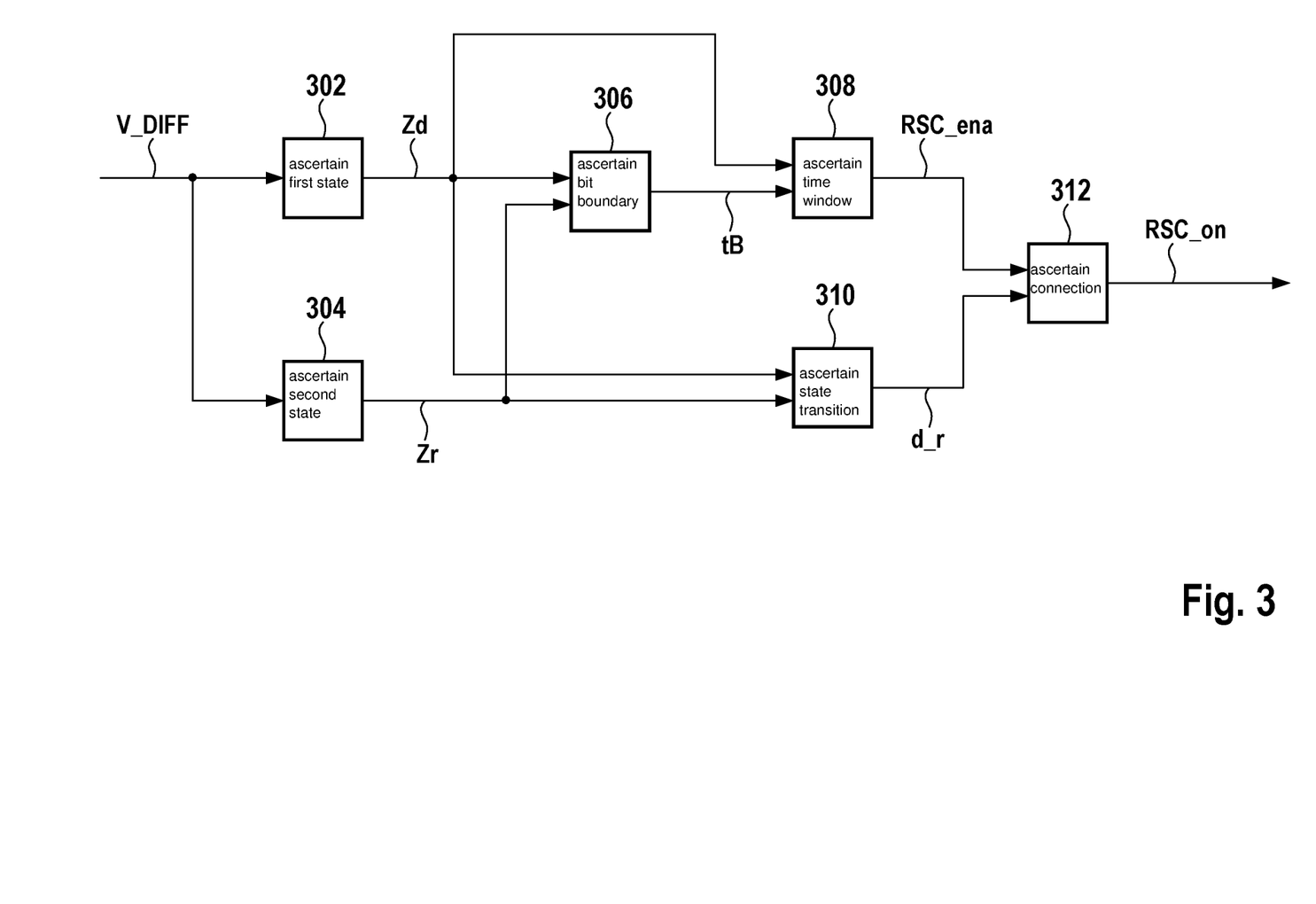
FIG. 3 schematically shows a block diagram in accordance with an example embodiment of the present invention.

FIG. 3 schematically shows a block diagram 300 for operating ascertainment circuit 102. First state Zd is ascertained according to a block 302. Second state Zr is ascertained according to a block 304. A block 306 ascertains a number of state transitions as a function of fed states Zd and Zr and is synchronized to the state transitions so that a bit boundary tB is ascertained, which is output, for example, in the form of a clock-pulse generator signal. A block 308 ascertains time window RSC_ena including one of the ascertained bit boundaries tB and outputs time window RSC_ena if first state Zd is present at the beginning of the ascertained time window. A block 310 ascertains state transition d_r from first state Zd into second state Zr. If state transition d_r falls into time window RSC_ena, then a block 312 ascertains the connection of the resistor between the two bus-side terminals of the circuit according to signal RSC_on.

Figure 4:
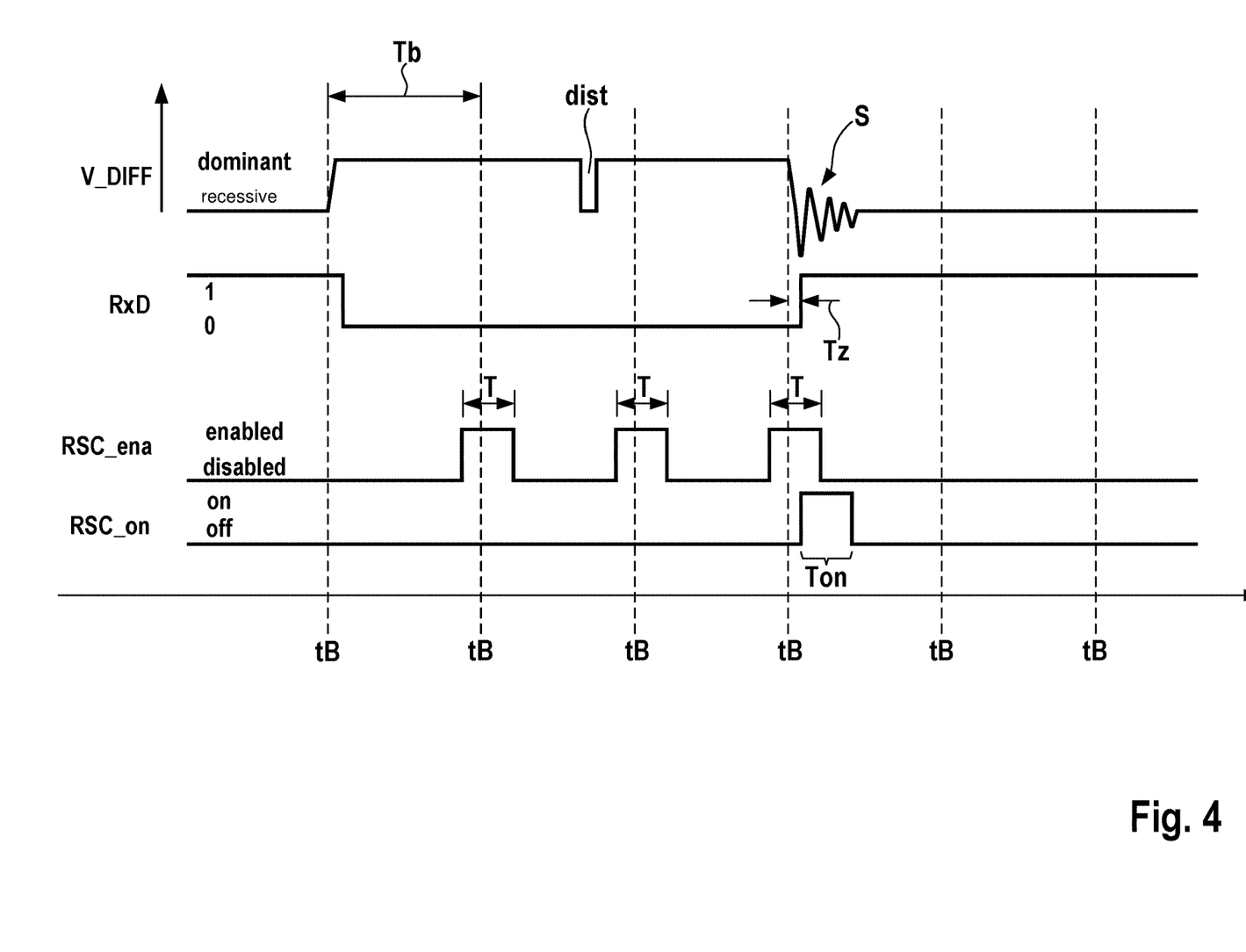
FIG. 4 schematically shows a signal-time diagram in accordance with an example embodiment of the present invention.

FIG. 4 schematically shows a signal-time diagram. A transition of voltage V_DIFF from the second state (recessive level) to the first state (dominant level) and back is shown. During the return from the first state into the second state, undesirable oscillations S may occur. In order to attenuate these, the resistor of the suppression circuit is connected between the two bus-side terminals during connection time period Ton once a rising edge is established in received output signal RxD and ascertained time window RSC_ena is also active during release time period T. Outside release time period T, a disturbance dist of voltage V_DIFF, which could be falsely interpreted as a state transition, does not result in the connection of the resistor.

Bit time Tb between two adjacent bit boundaries tB is also shown. Also shown is time offset Tz between the ascertainment of a rising edge of received output signal RxD and bit boundary tB from the perspective of the bus.

Figure 5:
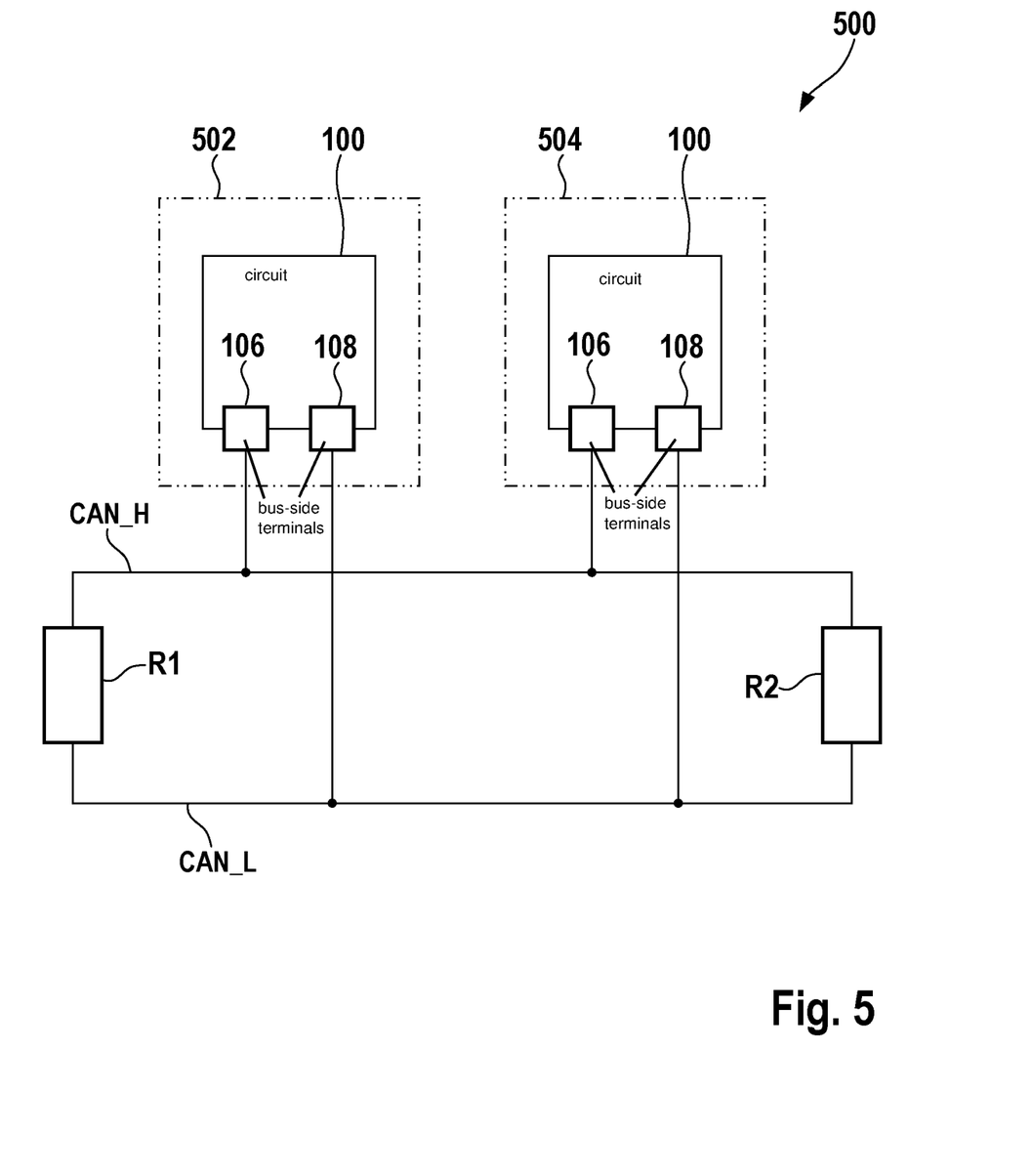
FIG. 5 shows an exemplary bus system in schematic form in accordance with the present invention.

FIG. 5 shows a bus system configured by way of example, including two user stations 502, 504. Each of user stations 502, 504 includes respective circuit 100, which is connected with first terminal 106 to first bus line CAN_H and with second terminal 108 to second bus line CAN_L. Bus lines CAN_H and CAN_L are interconnected at their ends via a respective terminating resistor R1 and R2. Activating/deactivating the suppression circuit between bus-side terminals 106, 108 causes respective circuits 100 of user stations 502 and 504 to attenuate and therefore reduce oscillations during a state change from dominant to recessive. Bus system 500 according to the exemplary embodiments operates according to the CAN standard such as, for example, ISO11898. Circuit 100 and the operation of the circuit may, however, also be readily applied to other bus systems. Moreover, other bus topologies are also possible.

What is claimed is:

1. A circuit for a bus system, comprising:
an ascertainment circuit configured to ascertain a first state in which an absolute difference of a voltage between two bus-side terminals is above a threshold value, to ascertain a second state in which the absolute difference of the voltage between the two bus-side terminals is below a threshold value, to ascertain a bit boundary as a function of a number of state transitions between the first state and the second state, and to ascertain at least one time window, a start of the time window being situated before the bit boundary and an end of the time window being situated after the bit boundary; and
a suppression circuit configured to be activated when a state transition from the first state into the second state occurs within the ascertained time window;
wherein the ascertainment circuit is configured to perform at least one of:
position the at least one time window around the bit boundary so that the time window begins maximally a first percentage of a bit time before the bit boundary and ends maximally a second percentage of the bit time after the bit boundary, and wherein the second percentage is greater than the first percentage, and/or
limit an activation time period of the suppression circuit to below a percentage of the bit time.

2. The circuit as recited in claim 1, wherein the suppression circuit is configured to be connected between the two bus-side terminals when a state transition from the first state into the second state occurs within the ascertained time window.

3. The circuit as recited in claim 1, wherein the suppression circuit is configured to drive a signal between the two bus-side terminals when a state transition from the first state into the second state occurs within the ascertained time window.

4. The circuit as recited in claim 1, wherein the ascertainment circuit is configured to block activation of the suppression circuit outside the at least one time window.

5. The circuit as recited in claim 1, wherein the ascertainment circuit is configured to deactivate the suppression circuit between the two bus-side terminals no later than when the at least one time window ends.

6. A circuit for a bus system, comprising:
an ascertainment circuit configured to ascertain a first state in which an absolute difference of a voltage between two bus-side terminals is above a threshold value, to ascertain a second state in which the absolute difference of the voltage between the two bus-side terminals is below a threshold value, to ascertain a bit boundary as a function of a number of state transitions between the first state and the second state, and to ascertain at least one time window, a start of the time window being situated before the bit boundary and an end of the time window being situated after the bit boundary; and
a suppression circuit configured to be activated when a state transition from the first state into the second state occurs within the ascertained time window;
wherein the ascertainment circuit is configured to position the at least one time window around the bit boundary so that the time window begins maximally 20% of a bit time before the bit boundary and ends maximally 50% of the bit time after the bit boundary.

7. The circuit as recited in claim 6, wherein the ascertainment circuit is configured to position the at least one time window around the bit boundary so that the time window begins maximally 10% of the bit time before the bit boundary and ends maximally 25% of the bit time after the bit boundary.

8. A circuit for a bus system, comprising:
an ascertainment circuit configured to ascertain a first state in which an absolute difference of a voltage between two bus-side terminals is above a threshold value, to ascertain a second state in which the absolute difference of the voltage between the two bus-side terminals is below a threshold value, to ascertain a bit boundary as a function of a number of state transitions between the first state and the second state, and to ascertain at least one time window, a start of the time window being situated before the bit boundary and an end of the time window being situated after the bit boundary; and
a suppression circuit configured to be activated when a state transition from the first state into the second state occurs within the ascertained time window;
wherein the ascertainment circuit is configured to limit an activation time period of the suppression circuit to below 50% of the bit time.

9. The circuit as recited in claim 8, wherein the ascertainment circuit is configured to limit the activation time period of the suppression circuit to below 30% of the bit time.

10. The circuit as recited in claim 1, wherein the ascertainment circuit is configured to ascertain a rising edge of a transmit input signal, and the suppression circuit is connected as a function of the ascertainment of the rising edge of the transmit input signal.

11. The circuit as recited in claim 10, wherein the ascertainment circuit is configured to ascertain a transmission state as a function of the transmit input signal and, during the ascertained transmission state, to not connect the suppression circuit as a function of the received output signal.

12. The circuit as recited in claim 1, wherein the ascertainment circuit is configured to ascertain a time offset between a transmission of a transmit input signal and a receipt of a received output signal corresponding to the transmit input signal, and to shift the ascertained time window as a function of the ascertained time offset.

13. The circuit as recited in claim 1, wherein the ascertainment circuit is configured to ascertain a data phase as a function of a profile of an absolute difference of the voltage between the two bus-side terminals, and to ascertain the time window only within the data phase.

14. A circuit for a bus system, comprising:
an ascertainment circuit configured to ascertain a first state in which an absolute difference of a voltage between two bus-side terminals is above a threshold value, to ascertain a second state in which the absolute difference of the voltage between the two bus-side terminals is below a threshold value, to ascertain a bit boundary as a function of a number of state transitions between the first state and the second state, and to ascertain at least one time window, a start of the time window being situated before the bit boundary and an end of the time window being situated after the bit boundary; and
a suppression circuit configured to be activated when a state transition from the first state into the second state occurs within the ascertained time window;
wherein the ascertainment circuit is configured to ascertain a data phase as a function of a profile of an absolute difference of the voltage between the two bus-side terminals, and to ascertain the time window only within the data phase, and
wherein the ascertainment circuit is configured to ascertain an arbitration phase and the data phase as a function of the profile of the absolute difference of the voltage between the two bus-side terminals, and to ascertain the time window during the arbitration phase to be larger than in the data phase.

15. A transceiver for a user station of a bus system, the transceiver comprising:
a circuit for the bus system, including:
an ascertainment circuit configured to ascertain a first state in which an absolute difference of a voltage between two bus-side terminals is above a threshold value, to ascertain a second state in which the absolute difference of the voltage between the two bus-side terminals is below a threshold value, to ascertain a bit boundary as a function of a number of state transitions between the first state and the second state, and to ascertain at least one time window, a start of the time window being situated before the bit boundary and an end of the time window being situated after the bit boundary; and
a suppression circuit configured to be activated when a state transition from the first state into the second state occurs within the ascertained time window;
wherein the ascertainment circuit is configured to perform at least one of:
position the at least one time window around the bit boundary so that the time window begins maximally a first percentage of a bit time before the bit boundary and ends maximally a second percentage of the bit time after the bit boundary, and wherein the second percentage is greater than the first percentage, and/or
limit an activation time period of the suppression circuit to below a percentage of the bit time.

16. A method for operating a circuit for a bus system, the method comprising:
ascertaining a first state, in which an absolute difference of a voltage between two bus-side terminals is above a threshold value;
ascertaining a second state, in which the absolute difference of the voltage between the two bus-side terminals is below a threshold value;
ascertaining a bit boundary as a function of a number of state transitions between the first state and the second state;
ascertaining a time window, a start of the time window being situated before the bit boundary, and an end of the time windows being after the bit boundary; and
activating a suppression circuit between the two bus-side terminals based on a state transition from the first state into the second state occurring within the ascertained time window;
wherein the ascertainings are performed via an ascertainment circuit, which is configured to perform at least one of:
position the at least one time window around the bit boundary so that the time window begins maximally a first percentage of a bit time before the bit boundary and ends maximally a second percentage of the bit time after the bit boundary, and wherein the second percentage is greater than the first percentage, and/or
limit an activation time period of the suppression circuit to below a percentage of the bit time.

* * * * *